US012164696B2

(12) United States Patent
Omer et al.

(10) Patent No.: US 12,164,696 B2
(45) Date of Patent: *Dec. 10, 2024

(54) RECOGNIZING GESTURES BASED ON WIRELESS SIGNALS

(71) Applicant: Cognitive Systems Corp., Waterloo (CA)

(72) Inventors: Mohammad Omer, Waterloo (CA); Anith Selvakumarasingam, Waterloo (CA); Christopher Snyder, Waterloo (CA); Stephen Arnold Devison, Kitchener (CA)

(73) Assignee: Cognitive Systems Corp., Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/145,941

(22) Filed: Dec. 23, 2022

(65) Prior Publication Data

US 2023/0125109 A1 Apr. 27, 2023

Related U.S. Application Data

(63) Continuation of application No. 16/425,310, filed on May 29, 2019, now Pat. No. 11,579,703.

(Continued)

(51) Int. Cl.
*G06F 3/01* (2006.01)
*G01S 7/00* (2006.01)
(Continued)

(52) U.S. Cl.
CPC .............. *G06F 3/017* (2013.01); *G01S 7/006* (2013.01); *G01S 13/003* (2013.01); *G01S 13/878* (2013.01)

(58) Field of Classification Search
CPC ...... A63F 13/40; A63F 13/428; A63F 13/212; A63F 13/235; A63F 13/44; A63F 13/67;
(Continued)

(56) References Cited

U.S. PATENT DOCUMENTS 4,054,879 A 10/1977 Wright et al.
4,649,388 A 3/1987 Atlas
(Continued)

FOREIGN PATENT DOCUMENTS

CA 2834522 5/2014
CA 2945702 8/2015
(Continued)

OTHER PUBLICATIONS

EPO, communication pursuant to Article 94(3) EPC mailed Feb. 14, 2023, in EP 19823575.6, 5 pgs.
(Continued)

*Primary Examiner* — Asghar H Bilgrami
(74) *Attorney, Agent, or Firm* — Henry Patent Law Firm PLLC

(57) ABSTRACT

In a general aspect, a motion detection system detects gestures (e.g., human gestures) and initiates actions in response to the detected gestures. In some aspects, channel information is obtained based on wireless signals transmitted through a space by one or more wireless communication devices. A gesture recognition engine analyzes the channel information to detect a gesture (e.g., a predetermined gesture sequence) in the space. An action to be initiated in response to the detected gesture is identified. An instruction to perform the action is sent to a network-connected device associated with the space.

21 Claims, 5 Drawing Sheets

Related U.S. Application Data

(60) Provisional application No. 62/686,446, filed on Jun. 18, 2018.

(51) Int. Cl.
    *G01S 13/00* (2006.01)
    *G01S 13/87* (2006.01)

(58) Field of Classification Search
    CPC ...... A63F 2300/10; G06F 3/011; G06F 3/014; G06F 3/017; G01S 13/003; G01S 13/878; G01S 7/006; G01S 3/017
    See application file for complete search history.

(56) References Cited

U.S. PATENT DOCUMENTS

| | | | |
|---|---|---|---|
| 4,740,045 A | 4/1988 | Goodson et al. | |
| 5,270,720 A | 12/1993 | Stove | |
| 5,613,039 A | 3/1997 | Wang et al. | |
| 5,696,514 A | 12/1997 | Nathanson et al. | |
| 6,075,797 A | 6/2000 | Thomas | |
| 6,380,882 B1 | 4/2002 | Hegnauer | |
| 6,573,861 B1 | 6/2003 | Hommel et al. | |
| 6,636,763 B1* | 10/2003 | Junker | G06F 3/013 340/4.11 |
| 6,914,854 B1 | 7/2005 | Heberley et al. | |
| 7,652,617 B2 | 1/2010 | Kurtz et al. | |
| 8,463,191 B2 | 6/2013 | Farajidana et al. | |
| 8,660,578 B1 | 2/2014 | Yang et al. | |
| 8,671,069 B2 | 3/2014 | Chang et al. | |
| 8,710,984 B2 | 4/2014 | Wilson et al. | |
| 8,812,654 B2 | 8/2014 | Gelvin et al. | |
| 8,832,244 B2 | 9/2014 | Gelvin et al. | |
| 8,836,344 B2 | 9/2014 | Habib et al. | |
| 8,836,503 B2 | 9/2014 | Gelvin et al. | |
| 9,030,321 B2 | 5/2015 | Breed | |
| 9,253,592 B1 | 2/2016 | Moscovich et al. | |
| 9,329,701 B2 | 5/2016 | Lautner | |
| 9,523,760 B1 | 12/2016 | Kravets et al. | |
| 9,524,628 B1 | 12/2016 | Omer et al. | |
| 9,551,784 B2 | 1/2017 | Katuri et al. | |
| 9,584,974 B1 | 2/2017 | Omer et al. | |
| 9,609,468 B1 | 3/2017 | Moscovich et al. | |
| 9,628,365 B2 | 4/2017 | Gelvin et al. | |
| 9,692,459 B2 | 6/2017 | Maltsev et al. | |
| 9,743,294 B1 | 8/2017 | Omer et al. | |
| 9,869,759 B2 | 1/2018 | Furuskog et al. | |
| 9,927,519 B1 | 3/2018 | Omer et al. | |
| 9,933,517 B1 | 4/2018 | Olekas et al. | |
| 9,946,351 B2* | 4/2018 | Sakaguchi | G06F 3/016 |
| 9,989,622 B1 | 6/2018 | Griesdorf et al. | |
| 10,004,076 B1 | 6/2018 | Griesdorf et al. | |
| 10,048,350 B1 | 8/2018 | Piao et al. | |
| 10,051,414 B1 | 8/2018 | Omer et al. | |
| 10,077,204 B2 | 9/2018 | Maschmeyer et al. | |
| 10,108,903 B1 | 10/2018 | Piao et al. | |
| 10,109,167 B1 | 10/2018 | Olekas et al. | |
| 10,109,168 B1 | 10/2018 | Devison et al. | |
| 10,111,228 B2 | 10/2018 | Griesdorf et al. | |
| 10,129,853 B2 | 11/2018 | Manku et al. | |
| 2002/0080014 A1* | 6/2002 | McCarthy | B60N 2/002 340/426.1 |
| 2003/0108119 A1 | 6/2003 | Mohebbi et al. | |
| 2006/0152404 A1 | 7/2006 | Fullerton et al. | |
| 2006/0284757 A1 | 12/2006 | Zemany | |
| 2007/0036353 A1* | 2/2007 | Reznik | H04L 63/18 380/30 |
| 2007/0296571 A1 | 12/2007 | Kolen | |
| 2008/0119130 A1 | 5/2008 | Sinha | |
| 2008/0240008 A1 | 10/2008 | Backes et al. | |
| 2008/0258907 A1 | 10/2008 | Kalpaxis | |
| 2008/0300055 A1* | 12/2008 | Lutnick | G06F 3/011 463/39 |
| 2008/0303655 A1 | 12/2008 | Johnson | |
| 2009/0062696 A1 | 3/2009 | Nathan et al. | |
| 2009/0180444 A1 | 7/2009 | McManus et al. | |
| 2010/0073686 A1 | 3/2010 | Medeiros et al. | |
| 2010/0127853 A1 | 5/2010 | Hanson et al. | |
| 2010/0130229 A1 | 5/2010 | Sridhara et al. | |
| 2010/0306320 A1 | 12/2010 | Leppanen et al. | |
| 2010/0315284 A1 | 12/2010 | Trizna et al. | |
| 2011/0019587 A1 | 1/2011 | Wang | |
| 2011/0035491 A1 | 2/2011 | Gelvin et al. | |
| 2011/0263946 A1* | 10/2011 | el Kaliouby | G06K 9/00335 600/300 |
| 2012/0115512 A1 | 5/2012 | Grainger et al. | |
| 2012/0146788 A1 | 6/2012 | Wilson et al. | |
| 2012/0283896 A1* | 11/2012 | Persaud | E02F 9/205 701/2 |
| 2013/0017836 A1 | 1/2013 | Chang et al. | |
| 2013/0090151 A1 | 4/2013 | Ngai et al. | |
| 2013/0094538 A1 | 4/2013 | Wang | |
| 2013/0113647 A1 | 5/2013 | Sentelle et al. | |
| 2013/0162459 A1 | 6/2013 | Aharony et al. | |
| 2013/0178231 A1 | 7/2013 | Morgan | |
| 2013/0283256 A1 | 10/2013 | Proud | |
| 2014/0028539 A1 | 1/2014 | Newham et al. | |
| 2014/0135042 A1 | 5/2014 | Buchheim et al. | |
| 2014/0148195 A1 | 5/2014 | Bassan-Eskenazi et al. | |
| 2014/0247179 A1 | 9/2014 | Furuskog | |
| 2014/0266669 A1 | 9/2014 | Fadell et al. | |
| 2014/0274218 A1 | 9/2014 | Kadiwala et al. | |
| 2014/0286380 A1 | 9/2014 | Prager et al. | |
| 2014/0329540 A1 | 11/2014 | Duggan et al. | |
| 2014/0355713 A1 | 12/2014 | Bao et al. | |
| 2014/0361920 A1 | 12/2014 | Katuri et al. | |
| 2015/0043377 A1 | 2/2015 | Cholas et al. | |
| 2015/0063323 A1 | 3/2015 | Sadek et al. | |
| 2015/0078295 A1 | 3/2015 | Mandyam et al. | |
| 2015/0098377 A1 | 4/2015 | Amini et al. | |
| 2015/0159100 A1 | 6/2015 | Shi et al. | |
| 2015/0181388 A1 | 6/2015 | Smith | |
| 2015/0195100 A1 | 7/2015 | Imes et al. | |
| 2015/0212205 A1 | 7/2015 | Shpater | |
| 2015/0245164 A1 | 8/2015 | Merrill | |
| 2015/0288745 A1 | 10/2015 | Moghaddam et al. | |
| 2015/0304886 A1 | 10/2015 | Liu et al. | |
| 2015/0309166 A1 | 10/2015 | Sentelle et al. | |
| 2015/0312877 A1 | 10/2015 | Bhanage | |
| 2015/0338507 A1 | 11/2015 | Oh et al. | |
| 2015/0350849 A1 | 12/2015 | Huang et al. | |
| 2016/0018508 A1 | 1/2016 | Chen et al. | |
| 2016/0054804 A1 | 2/2016 | Gollakota et al. | |
| 2016/0088438 A1 | 3/2016 | O'Keeffe | |
| 2016/0088631 A1 | 3/2016 | Hedayat et al. | |
| 2016/0135205 A1 | 5/2016 | Barbu et al. | |
| 2016/0150418 A1 | 5/2016 | Kang et al. | |
| 2016/0183059 A1 | 6/2016 | Nagy et al. | |
| 2016/0187475 A1 | 6/2016 | Horng et al. | |
| 2016/0210838 A1 | 7/2016 | Yan et al. | |
| 2016/0259421 A1 | 9/2016 | Gollakota et al. | |
| 2016/0262355 A1 | 9/2016 | Swan | |
| 2016/0363663 A1* | 12/2016 | Mindell | G01S 5/021 |
| 2017/0042488 A1 | 2/2017 | Muhsin | |
| 2017/0052247 A1 | 2/2017 | Kong et al. | |
| 2017/0055126 A1 | 2/2017 | O'Keeffe | |
| 2017/0055131 A1 | 2/2017 | Kong et al. | |
| 2017/0059190 A1 | 3/2017 | Stefanski et al. | |
| 2017/0086281 A1 | 3/2017 | Avrahamy | |
| 2017/0090026 A1 | 3/2017 | Joshi et al. | |
| 2017/0111852 A1 | 4/2017 | Selen et al. | |
| 2017/0123528 A1* | 5/2017 | Hu | G06F 3/044 |
| 2017/0126488 A1 | 5/2017 | Cordeiro et al. | |
| 2017/0146656 A1 | 5/2017 | Belsley et al. | |
| 2017/0155439 A1 | 6/2017 | Chang et al. | |
| 2017/0195893 A1 | 7/2017 | Lee et al. | |
| 2017/0223628 A1 | 8/2017 | Snyder et al. | |
| 2017/0278374 A1 | 9/2017 | Skaaksrud | |
| 2017/0280351 A1 | 9/2017 | Skaaksrud | |
| 2017/0311279 A1 | 10/2017 | Allegue et al. | |
| 2017/0311574 A1 | 11/2017 | Swan | |
| 2017/0343658 A1 | 11/2017 | Ramirez et al. | |
| 2018/0027389 A1 | 1/2018 | Shirakata et al. | |

(56) References Cited

U.S. PATENT DOCUMENTS

| | | | |
|---|---|---|---|
| 2018/0086264 A1 | 3/2018 | Pedersen | |
| 2018/0106885 A1 | 4/2018 | Blayvas | |
| 2018/0120420 A1* | 5/2018 | McMahon | G01S 13/62 |
| 2018/0157336 A1 | 6/2018 | Harris et al. | |
| 2018/0180706 A1 | 6/2018 | Li et al. | |
| 2018/0288587 A1 | 10/2018 | Allegue Martinez et al. | |
| 2018/0330293 A1 | 11/2018 | Kulkarni et al. | |
| 2019/0272718 A1* | 9/2019 | Hurtig | G06F 3/167 |
| 2019/0384409 A1 | 12/2019 | Omer et al. | |

FOREIGN PATENT DOCUMENTS

| | | |
|---|---|---|
| CN | 104615244 | 5/2015 |
| CN | 105807935 | 7/2016 |
| JP | 1997-507298 | 7/1997 |
| JP | 2004286567 | 10/2004 |
| JP | 2013072865 | 4/2013 |
| WO | 2014021574 | 2/2014 |
| WO | 2014201574 | 12/2014 |
| WO | 2015168700 | 11/2015 |
| WO | 2016005977 | 1/2016 |
| WO | 2016066822 | 5/2016 |
| WO | 2016110844 | 7/2016 |
| WO | 2016170011 | 10/2016 |
| WO | 2017106976 | 6/2017 |
| WO | 2017132765 | 8/2017 |
| WO | 2017177303 | 10/2017 |
| WO | 2017193200 | 11/2017 |
| WO | 2017210770 | 12/2017 |
| WO | 2018094502 | 5/2018 |
| WO | 2019041019 | 3/2019 |
| WO | 2019241877 | 12/2019 |

OTHER PUBLICATIONS

1 JPO, Office Action issued in Application No. 2020-569199 on Jun. 12, 2023, 2 pages.
EPO, Extended European Search Report mailed Jul. 27, 2021, in EP 19823575.6, 11 pgs.
USPTO, Final Office Action mailed Oct. 26, 2020, in U.S. Appl. No. 16/425,310, 15 pgs.
USPTO, Non-Final Office Action mailed May 27, 2020, in U.S. Appl. No. 16/425,310, 15 pgs.
USPTO, Final Office Action mailed Jan. 17, 2020, in U.S. Appl. No. 16/425,310, 18 pgs.
USPTO, Notice of Allowance mailed Oct. 19, 2022, in U.S. Appl. No. 16/425,310, 25 pgs.
USPTO, Non-Final Office Action mailed Jul. 12, 2019, in U.S. Appl. No. 16/425,310, 29 pgs.
USPTO, Advisory Action mailed Apr. 7, 2020, in U.S. Appl. No. 16/425,310, 3 pgs.
WIPO, International Search Report and Written Opinion mailed Aug. 16, 2019, in PCT/CA2019/050843, 9 pgs.
Abdelnasser, et al., "WiGest: A Ubiquitous WiFi-based Gesture Recognition System", IEEE Conf. on Computer Communications, 2015, 9 pgs.
Dekker, et al., "Gesture Recognition with a Low Power FMCW Radar and a Deep Convolutional Neural Network", Proceedings of the 14th European Radar Conference, Nuremberg, Germany, Oct. 11-13, 2017, 4 pgs.
Domenico, et al., "Exploring Training Options for RF Sensing Using CSI", IEEE Communications Magazine, 2018, vol. 56, Issue 5, pp. 116-123, 8 pgs.
Iqbal, et al., "Indoor Motion Classification Using Passive RF Sensing Incorporating Deep Learning", ISSN: 2577-2465, Electronic IEEE, Jun. 3, 2018, 5 pgs.
Kosba, et al., "Robust WLAN Device-free Passive Motion Detection", IEEE Wireless Communications and Networking Conference, Apr. 2012, 6 pgs.
Wang, et al., "Wi-Fi CSI-Based Behavoir Recognition: From Signals and Actions to Activities", IEEE Communications Magazine, May 1, 2018, 7 pgs.
Youssef, Moustafa, et al., "Challenges: Device-free Passive Localization for Wireless Environments", Mobicom 07 Proceedings of the 13th Annual ACM International Conference on Mobile Computing and Networking, Sep. 2007, 11 pgs.
EPO, Communication pursuant to Article 94(3) issued in Application No. 19823575.6 on Mar. 12, 2024, 8 pages.
Li, Hong, et al., "WiFinger: Talk to Your Smart Devices with Finger-grained Gesture", UBICOMP '16, Session: Interacting Using the Hands and Eyes, Sep. 12-16, 2016, pp. 250-261, 12 pages.
KIPO, Office Action issued in Application No. 2020-7036155 on Aug. 26, 2024, 19 pages.

* cited by examiner

RECOGNIZING GESTURES BASED ON WIRELESS SIGNALS

CROSS-REFERENCE TO RELATED APPLICATIONS

This application is a continuation of U.S. patent application Ser. No. 16/425,310, filed May 29, 2019, which claims priority to U.S. Provisional Application No. 62/686,446 entitled "Motion Detection Based on Beamforming Dynamic Information" and filed Jun. 18, 2018. The priority applications are hereby incorporated by reference.

BACKGROUND

The following description relates to recognizing gestures (e.g., human gestures) based on wireless signals.

Motion detection systems have been used to detect movement, for example, of objects in a room or an outdoor area. In some example motion detection systems, infrared or optical sensors are used to detect movement of objects in the sensor's field of view. Motion detection systems have been used in security systems, automated control systems and other types of systems.

DETAILED DESCRIPTION

Figure 1:
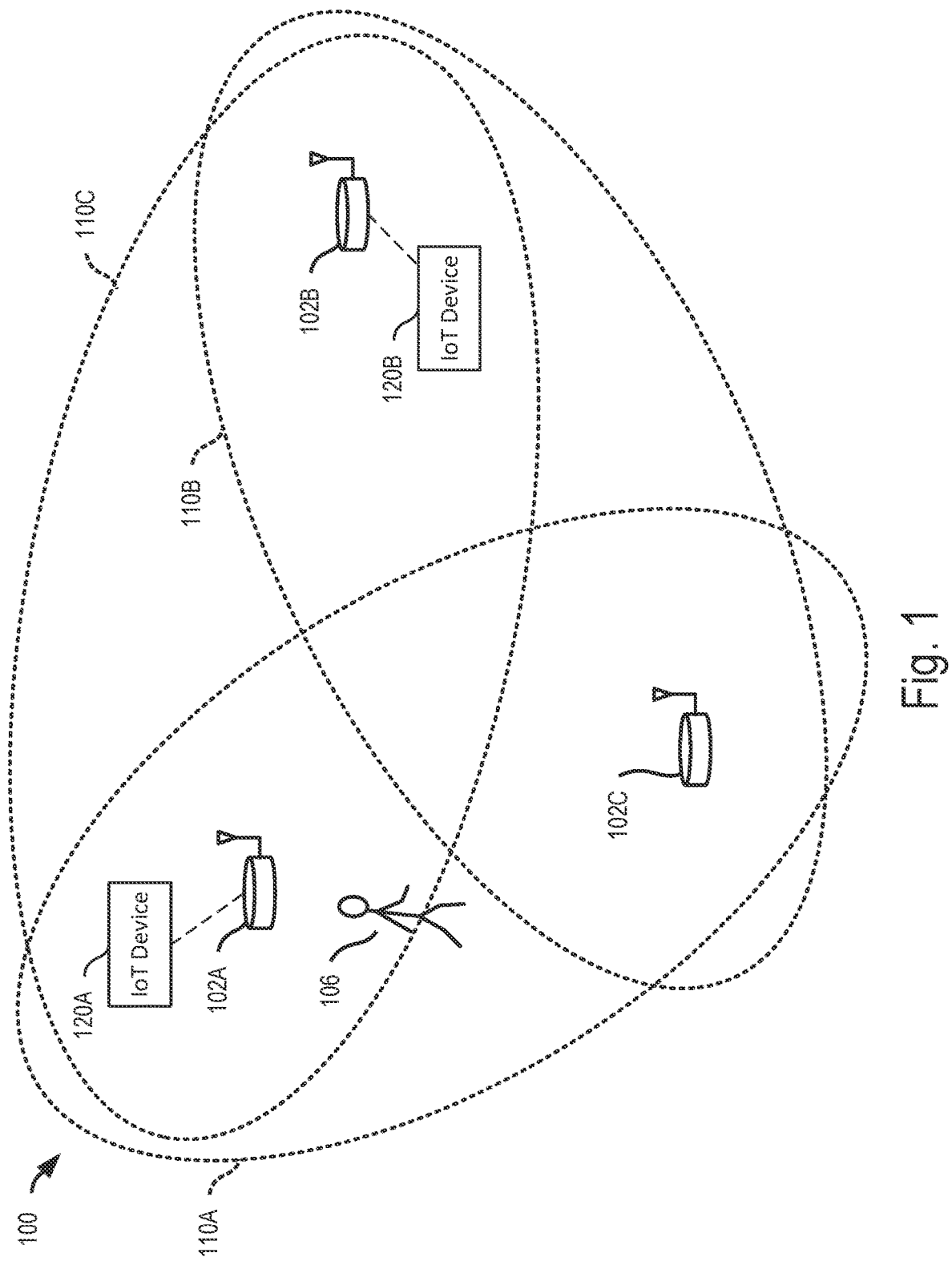
FIG. 1 is a diagram showing an example wireless communication system.

In some aspects of what is described here, a motion detection system detects gestures (e.g., human gestures) and initiates actions in response to the gestures. For example, time and frequency information that procedural gesture events produce on a wireless channel spectrum can be leveraged to initiate actions. In some cases, a state machine may be used to detect the sequence of gesture events that have disturbed the wireless channel in a specific way. These disturbances of the wireless channel may become manifest in channel information collected from wireless signals, which can be analyzed in time and/or frequency domains to distinguish between and recognize different gestures. In some implementations, at the end of a sequence of gestures, a state machine triggers an action command to a connected device (e.g., an IoT device) to perform a specified action.

In some instances, aspects of the systems and techniques described here provide technical improvements and advantages over existing approaches. For example, the systems and techniques described here may provide a gesture-based interface with IoT devices or other network-connected devices (e.g., through touch-free interaction) to enable or disable services at any location where there is wireless coverage. This may provide an alternative or an improvement over technologies (e.g., voice assistants) that leverage audio signals and require audible proximity to an audio sensor (e.g. a microphone). Because radio-frequency and other wireless signals can propagate through walls and over larger distances, the time and frequency signature imprinted from a gesture in a wide range of locations can be obtained and analyzed by the device collecting the channel information. Accordingly, the systems and techniques described here may provide improved user interaction with network-connected devices and other types of network-accessed services.

In some instances, wireless signals received at each of the wireless communication devices in a wireless communication network may be analyzed to determine channel information. The channel information may be representative of a physical medium that applies a transfer function to wireless signals that traverse a space. In some instances, the channel information includes a channel response. Channel responses can characterize a physical communication path, representing the combined effect of, for example, scattering, fading, and power decay within the space between the transmitter and receiver. In some instances, the channel information includes beamforming state information (e.g., a feedback matrix, a steering matrix, channel state information (CSI), etc.) provided by a beamforming system. Beamforming is a signal processing technique often used in multi antenna (multiple-input/multiple-output (MIMO)) radio systems for directional signal transmission or reception. Beamforming can be achieved by operating elements in an antenna array in such a way that signals at particular angles experience constructive interference while others experience destructive interference.

The channel information for each of the communication links may be analyzed (e.g., by a hub device or other device in a wireless communication network, or a remote device communicably coupled to the network) to detect whether motion (e.g., gestures or another type of motion) has occurred in the space, to determine a relative location of the detected motion, or both. In some aspects, the channel information for each of the communication links may be analyzed to detect a gesture or a gesture sequence, and a secondary action can be initiated based on the detected gesture or gesture sequence.

Example motion detection systems and localization processes that can be used to detect motion based on wireless signals include the techniques described in U.S. Pat. No. 9,523,760 entitled "Detecting Motion Based on Repeated Wireless Transmissions," U.S. Pat. No. 9,584,974 entitled "Detecting Motion Based on Reference Signal Transmissions," U.S. Pat. No. 10,051,414 entitled "Detecting Motion Based On Decompositions Of Channel Response Variations," U.S. Pat. No. 10,048,350 entitled "Motion Detection Based on Groupings of Statistical Parameters of Wireless Signals," U.S. Pat. No. 10,108,903 entitled "Motion Detection Based on Machine Learning of Wireless Signal Properties," U.S. Pat. No. 10,109,167 entitled "Motion Localization in a Wireless Mesh Network Based on Motion Indicator Values," U.S. Pat. No. 10,109,168 entitled "Motion Localization Based on Channel Response Characteristics," and other techniques.

FIG. 1 illustrates an example wireless communication system 100. The example wireless communication system 100 includes three wireless communication devices 102A, 102B, 102C and two Internet-of-Things (IoT) devices 120A, 120B. The example wireless communication system 100 may include additional devices and/or other components (e.g., one or more network servers, network routers, network switches, cables, or other communication links, etc.).

In some cases, the wireless communication system 100 can be deployed in a physical environment such as a home, an office or another type of space, and one or more components of the wireless communication system 100 may operate in coordinate with or as a component of a motion detection system. For instance, software associated with a motion detection system may be installed and executed on one or more of the wireless communication devices 102A, 102B, 102C, or on another computer device in the physical environment, on a remote server, on a cloud-based computer system, etc.

In some instances, the motion detection system performs gesture recognition and initiates predetermined actions in response to detecting specified human gestures or human gesture sequences. Accordingly, the motion detection system may provide Wi-Fi based gesture recognition within a home or office space, which may enable users to activate or deactivate any type of event wirelessly through pre-programmed or trained gestures. The gestures can be single-gesture or multi-gesture events. A single gesture can be, for example, a single continuous motion, whereas a multi-gesture event can be, for example, more than one gesture (of similar or different type) performed in sequence. The gestures in a multi-gesture event can be separated with a variable pause between the gestures, for example, to form gesture sequences that are distinct. As an example, the sequence of wave, long pause (e.g., 2 seconds), and wave, could be a distinct gesture from wave, short pause (e.g., 1 second), wave. Other types of gesture events may be detected by the motion detection system.

In some implementations, gestures can be coupled with localization information (e.g., from any source) to perform a different action depending on the location of the user. As an example, a user who performs the single gesture of an open palm rising vertically in the living room could trigger a volume increase on the living room television, and a horizontal swiping motion in the living room could trigger a channel change on the living room television; whereas the same gestures in the kitchen may trigger similar adjustments on the kitchen television. As another example, a user who performs the multi-gesture of two hand waves in sequence within a bedroom may dismiss an alarm sounding on the bedroom alarm clock, for example, and three hand waves in sequence can toggle the bedroom lights on or off; whereas the same gestures in another bedroom may trigger the same or different actions within that bedroom.

In some implementations, a gesture recognition engine receives channel information from one or more of the wireless communication devices 102A, 102B, 102C, which collect the channel information based on wireless signals transmitted through the physical environment of the wireless communication system 100. The gesture recognition engine performs a deep inspection of the frequency content of the channel information over time. In some cases, when a gesture is recognized by the gesture recognition engine, a state machine can be invoked. After the completion of a gesture or gesture sequence has been detected, an action can be initiated (e.g., by sending a commend to one of the IoT devices 120A, 120B) depending on the end state of the state machine.

The example wireless communication devices 102A, 102B, 102C and the IoT devices 120A, 120B can operate in a wireless network, for example, according to a wireless network standard or another type of wireless communication protocol. For example, the wireless network may be configured to operate as a Wireless Local Area Network (WLAN), a Personal Area Network (PAN), a metropolitan area network (MAN), or another type of wireless network. Examples of WLANs include networks configured to operate according to one or more of the 802.11 family of standards developed by IEEE (e.g., Wi-Fi networks), and others. Examples of PANs include networks that operate according to short-range communication standards (e.g., BLUETOOTH®, Near Field Communication (NFC), Zig-Bee), millimeter wave communications, and others.

In some implementations, the wireless communication devices 102A, 102B, 102C may be configured to communicate in a cellular network, for example, according to a cellular network standard. Examples of cellular networks include networks configured according to 2G standards such as Global System for Mobile (GSM) and Enhanced Data rates for GSM Evolution (EDGE) or EGPRS; 3G standards such as Code Division Multiple Access (CDMA), Wideband Code Division Multiple Access (WCDMA), Universal Mobile Telecommunications System (UMTS), and Time Division Synchronous Code Division Multiple Access (TD-SCDMA); 4G standards such as Long-Term Evolution (LTE) and LTE-Advanced (LTE-A); 5G standards, and others.

In some cases, one or more of the wireless communication devices 102 is a Wi-Fi access point or another type of wireless access point (WAP). In some cases, one or more of the wireless communication devices 102 is an access point of a wireless mesh network, such as, for example, a commercially-available mesh network system (e.g., GOOGLE Wi-Fi, EERO mesh, etc.). In some cases, one or more of the wireless communication devices 102 is a mobile device (e.g., a smartphone, a smart watch, a tablet, a laptop computer, etc.), an IoT device (e.g., a Wi-Fi enabled thermostat, a Wi-Fi enabled lighting control, a Wi-Fi enabled camera, a smart TV, a Wi-Fi enabled doorbell), or another type of device that communicates in a wireless network.

The IoT devices 120A, 120B are examples of network-connected devices that can communicate with one or more of the wireless communication devices 102. The IoT devices 120A, 120B may include, for example, a network-connected thermostat, a network-connected lighting control, a network-connected camera, a network-connected TV, a network-connected doorbell, etc. Generally, a network-connected device may communicate with other devices over a communication network using a wired connection (e.g., Ethernet cable), a wireless connection (e.g., Local Area Network connection) or both.

In the example shown in FIG. 1, the IoT devices 120A, 120B communicate over a Wi-Fi network, but IoT devices may communicate over other types of wireless networks, including ad-hoc networks, personal area networks, cellular networks, satellite networks, and others. As shown in FIG. 1, the example IoT device 120A communicates with the wireless communication device 102A, and the example IoT device 120B communicates with the wireless communication device 102B. For example, the wireless communication devices 102A, 102B may be wireless routers (e.g., wireless mesh routers) or wireless access points (e.g., Wi-Fi access points) in a wireless network, and the IoT devices 120A, 120B may access the wireless network through their respective communication links with the wireless communication devices 102A, 102B.

In the example shown in FIG. 1, the wireless communication devices 102 transmit wireless signals to each other over wireless communication links, and the wireless signals communicated between the devices can be used as motion probes to detect motion of objects and gestures (e.g., human gestures) in the signal paths between the devices. In some implementations, standard signals (e.g., channel sounding signals, beacon signals), non-standard reference signals, or other types of wireless signals can be used as motion probes.

In the example shown in FIG. 1, the wireless communication link between the wireless communication devices 102A, 102C can be used to probe a first motion detection zone 110A, the wireless communication link between the wireless communication devices 102B, 102C can be used to probe a second motion detection zone 110B, and the wireless communication link between the wireless communication device 102A, 102B can be used to probe a third motion detection zone 110C. In some instances, the motion detection zones 110 can include, for example, air, solid materials, liquids, or another medium through which wireless electromagnetic signals may propagate.

In the example shown in FIG. 1, when an object moves or when a person gestures in any of the motion detection zones 110, the motion detection system may detect the motion or gesture based on signals transmitted through the relevant motion detection zone 110. Generally, the object can be any type of static or moveable object, and can be living or inanimate. For example, the object can be a human (e.g., the person 106 shown in FIG. 1), an animal, an inorganic object, or another device, apparatus, or assembly, an object that defines all or part of the boundary of a space (e.g., a wall, door, window, etc.), or another type of object.

In some examples, the wireless signals may propagate through a structure (e.g., a wall) before or after interacting with a moving object, which may allow the moving object's movement to be detected without an optical line-of-sight between the moving object and the transmission or receiving hardware. In some instances, the motion detection system may communicate the motion or gesture detection event to another device or system, such as a security system or a control center.

In some cases, the wireless communication devices 102 themselves are configured to perform one or more operations of the motion detection system, for example, by executing computer-readable instructions (e.g., software or firmware) on the wireless communication devices. For example, each device may process received wireless signals to detect motion based on changes detected in the communication channel. In some cases, another device (e.g., a remote server, a network-attached device, etc.) is configured to perform one or more operations of the motion detection system. For example, each wireless communication device 102 may send channel information to central device or system that performs operations of the motion detection system.

In an example aspect of operation, wireless communication devices 102A, 102B may broadcast wireless signals or address wireless signals to other the wireless communication device 102C, and the wireless communication device 102C (and potentially other devices) receives the wireless signals transmitted by the wireless communication devices 102A, 102B. The wireless communication device 102C (or another system or device) then processes the received wireless signals to detect motion of an object, human gestures or human gesture sequences in a space accessed by the wireless signals (e.g., in the zones 110A, 110B). In some instances, the wireless communication device 102C (or another system or device) may perform one or more operations of the example processes 300, 400 described with respect to FIGS. 3 and 4.

In some aspects of operation, channel information is obtained based on wireless signals transmitted through a space (e.g., through all or part of a home, office, outdoor area, etc.) by one or more of the wireless communication devices 102A, 102B, 102C. A gesture recognition engine analyzes the channel information to detect a gesture in the space. The gesture can include, for example, a hand wave, a hand swipe, arm movements, leg movements, head movements, or other types of human gestures. In some cases, the gesture recognition engine detects a sequence of such gestures. For example, a state machine can be used to detect a sequence of gestures as described with respect to FIG. 3.

In some aspects of operation, an action to be initiated in response to the detected gesture or gesture sequence is identified (e.g., based on the type of gesture or sequence gesture, based on a state of a state machine, or otherwise). The action can be, for example, turning lights on or off, turning a television or other device on or off, adjusting the volume of a speaker or other device, adjusting a thermostat setting, etc. An instruction (e.g., a command) to perform the action may then be sent to a network-connected device (e.g., one or both of the IoT devices 120A, 120B) that will perform the action. As an example, the IoT device 102A may be a network-connected TV that receives a channel change command, a network-connected thermostat that receives a temperature adjustment command, a network-connected speaker that receives a volume adjustment command, a network-connected lighting system that receives a light toggle command, a network-connected device that receives a command to arm or disarm a security system, etc. The network-connected device may then perform the corresponding action in response to receiving the instruction.

In some cases, a location of the gesture may be detected, and the action to be initiated can be determined based on the location of the gesture. For instance, the location of the gesture (e.g., a specific room or zone of a home or office environment) may be associated with a type of action to be performed (e.g., arm/disarm security device), a location of the action to be performed (e.g., a room in which to turn lights on/off), or a device to perform the action (e.g., a specific TV). The location of the gesture may be detected by the motion detection system (e.g., based on the channel information) or in another manner. For example, another type of sensor may be used to detect the location of a user who made the gesture.

In some cases, the gesture is detected by using a time-frequency filter to detect a time-frequency signature of the gesture. For example, the channel information may include a time series of channel responses, and the time-frequency filter may apply weighting coefficients to frequency components (subcarriers) of the channel responses. The time-frequency filter may include an adaptive time-frequency filter that tunes the weighting coefficients (e.g., according to an optimization algorithm or otherwise) to detect time-frequency signatures of multiple gesture types. For instance, the adaptive time-frequency filter may tune the weighting coefficients to detect gestures that modulate the channel responses at a frequency range corresponding to human gestures (e.g., 0 to 4 Hertz, 0.25 to 0.75 Hertz, or another frequency range). An example of an adaptive time-frequency filter is described with respect to FIG. 4.

Figure 2A:
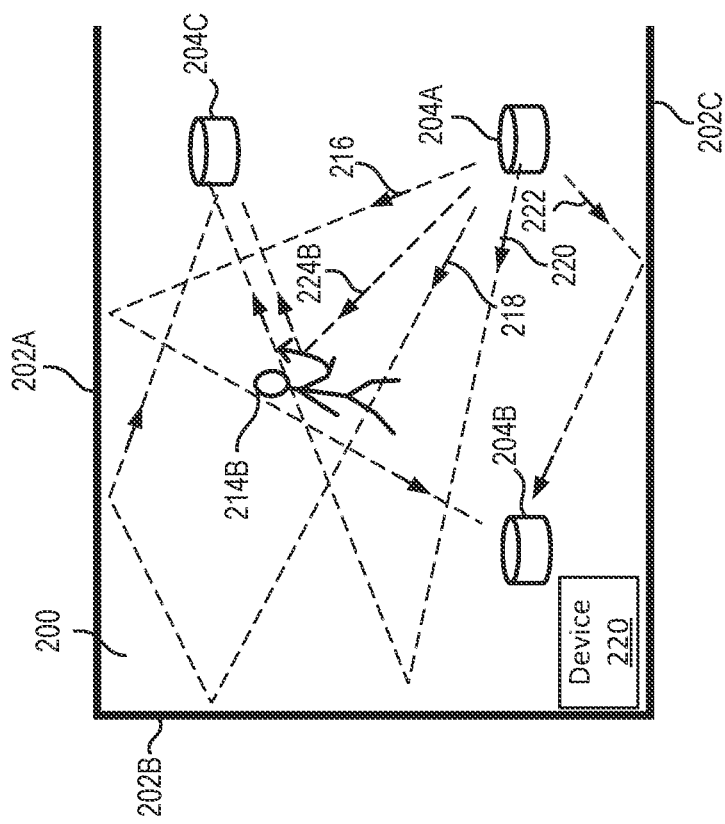
FIGS. 2A-2B are diagrams showing example wireless signals communicated between wireless communication devices.
Figure 2B:
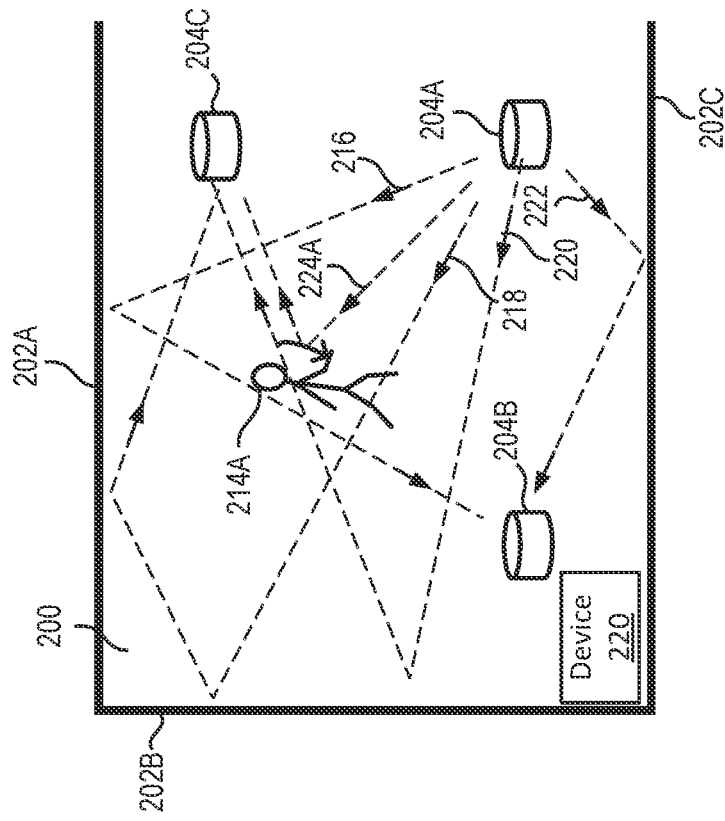

FIGS. 2A and 2B are diagrams showing example wireless signals communicated between wireless communication devices 204A, 204B, 204C. The wireless communication devices 204A, 204B, 204C may be, for example, the wireless communication devices 102A, 102B, 102C shown in FIG. 1, or may be other types of wireless communication devices. As shown in FIGS. 2A and 2B, the wireless communication devices 204A, 204B, 204C reside in a space 200 with a network-connected device 220. The network-connected device 220 may be, for example, one of the IoT devices 120A, 120B shown in FIG. 1, or another type of network-connected device.

The example wireless communication devices 204A, 204B, 204C can transmit wireless signals through the space 200. The example space 200 may be completely or partially enclosed or open at one or more boundaries of the space 200. The space 200 may be or may include an interior of a room, multiple rooms, a building, an indoor area, outdoor area, or the like. A first wall 202A, a second wall 202B, and a third wall 202C at least partially enclose the space 200 in the example shown.

As shown, a person makes a first gesture 214A at an initial time (t0) in FIG. 2A, and the person makes a second gesture 214B at subsequent time (t1) in FIG. 2B. In FIGS. 2A and 2B, the gestures are arm movements—the person makes the first gesture 214A by waving an arm downward, and the person makes the second gesture 214B by waving an arm upward. In the example shown, there is a pause between the first and second gestures 214A, 214B. For example, the person may wait one or two seconds between the gestures 214A, 214B. The first gesture 214A and the second gesture 214B provide one example of a gesture sequence that can be used to initiate an action by the network connected device 220. These and other types of gestures and gesture sequences may be detected based on the motion probe signals transmitted by the wireless communication device 204A.

One or more of the wireless communication devices 204A, 204B, 204C can be part of, or may be used by, a motion detection system. In the example shown in FIGS. 2A and 2B, the first wireless communication device 204A transmits wireless motion probe signals repeatedly (e.g., periodically, intermittently, at scheduled, unscheduled or random intervals, etc.). The second and third wireless communication devices 204B, 204C receive signals based on the motion probe signals transmitted by the wireless communication device 204A.

The example wireless signals shown in FIGS. 2A and 2B may experience attenuation, frequency shifts, phase shifts, or other effects through their respective paths and may have portions that propagate in another direction, for example, through the walls 202A, 202B, and 202C. The transmitted signal may have a number of frequency components in a frequency bandwidth. The transmitted signal may be transmitted from the first wireless communication device 204A in an omnidirectional manner, in a directional manner or otherwise. In the example shown, the wireless signals traverse multiple respective paths in the space 200, and the signal along each path may become attenuated due to path losses, scattering, reflection, or the like and may have a phase or frequency offset.

As shown in FIGS. 2A and 2B, multiple example paths of the wireless signals transmitted from the first wireless communication device 204A are illustrated by dashed lines. Along a first signal path 216, the wireless signal is transmitted from the first wireless communication device 204A and reflected off the first wall 202A toward the second wireless communication device 204B. Along a second signal path 218, the wireless signal is transmitted from the first wireless communication device 204A and reflected off the second wall 202B and the first wall 202A toward the third wireless communication device 204C. Along a third signal path 220, the wireless signal is transmitted from the first wireless communication device 204A and reflected off the second wall 202B toward the third wireless communication device 204C. Along a fourth signal path 222, the wireless signal is transmitted from the first wireless communication device 204A and reflected off the third wall 202C toward the second wireless communication device 204B.

As shown in FIG. 2A, the wireless signal interacts with the person along a fifth signal path 224A between the first wireless communication device 204A and the third wireless communication device 204C. As shown in FIGS. 2B, the wireless signal interacts with the person along a sixth signal path 224B between the first wireless communication device 204A and the third wireless communication device 204C. The fifth signal path 224A and the sixth signal path 224B are distinctly modulated over time at least partially by the distinct gestures 214A, 214B. For example, the first gesture 214A may have a first time-frequency signature that can be detected by a gesture recognition engine, while the second gesture 214B may have a second (distinct) time-frequency signature that can be detected by the gesture recognition engine.

As shown in FIGS. 2A and 2B, the signals from various paths 216, 218, 220, 222, 224A, and 224B combine at the third wireless communication device 204C and the second wireless communication device 204B to form received signals. Because of the effects of the multiple paths in the space 200 on the transmitted signal, the space 200 may be represented as a transfer function (e.g., a filter) in which the transmitted signal is input and the received signal is output. When an object moves in the space 200, the attenuation or phase offset affected upon a signal in a signal path can change, and hence, the transfer function of the space 200 can change. When the same wireless signal is transmitted from the first wireless communication device 204A, if the transfer function of the space 200 changes, the output of that transfer function, e.g. the received signal, will also change. A change in the received signal can be used to detect movement of an object. Conversely, in some cases, if the transfer function of the space does not change, the output of the transfer function—the received signal—will not change.

Mathematically, a transmitted signal f(t) transmitted from the first wireless communication device 204A may be described according to Equation (1):

$$f(t) = \sum_{n=-\infty}^{\infty} c_n e^{j\omega_n t} \tag{1}$$

where $\omega_n$ represents the frequency of $n^{th}$ frequency component of the transmitted signal, $c_n$ represents the complex coefficient of the $n^{th}$ frequency component, and t represents time. With the transmitted signal f(t) being transmitted from the first wireless communication device 204A, an output signal $r_k(t)$ from a path k may be described according to Equation (2):

$$r_k(t) = \sum_{n=-\infty}^{\infty} \alpha_{n,k} c_n e^{j(\omega_n t + \phi_{n,k})} \tag{2}$$

where $\alpha_{n,k}$ represents an attenuation factor (or channel response; e.g., due to scattering, reflection, and path losses) for the $n^{th}$ frequency component along path k, and $\phi_{n,k}$ represents the phase of the signal for $n^{th}$ frequency component along path k. Then, the received signal R at a wireless communication device can be described as the summation of all output signals $r_k(t)$ from all paths to the wireless communication device, which is shown in Equation (3):

$$R = \sum_k r_k(t) \qquad (3)$$

Substituting Equation (2) into Equation (3) renders the following Equation (4):

$$R = \sum_k \sum_{n=-\infty}^{\infty} (\alpha_{n,k} e^{j\phi_{n,k}}) c_n e^{j\omega_n t} \qquad (4)$$

The received signal R at a wireless communication device can then be analyzed, for example, to detect motion or to recognize gestures as described below. The received signal R at a wireless communication device can be transformed to the frequency domain, for example, using a Fast Fourier Transform (FFT) or another type of algorithm. The transformed signal can represent the received signal R as a series of n complex values, one for each of the respective frequency components (at the n frequencies $\omega_n$). For a frequency component at frequency $\omega_n$, a complex value $Y_n$ may be represented as follows in Equation (5):

$$Y_n = \sum_k c_n \alpha_{n,k} e^{j\phi_{n,k}}. \qquad (5)$$

The complex value $Y_n$ for a given frequency component $\omega_n$ indicates a relative magnitude and phase offset of the received signal at that frequency component $\omega_n$. When an object moves in the space, the complex value $Y_n$ changes due to the channel response $\alpha_{n,k}$ of the space changing. Accordingly, a change detected in the channel response (and thus, the complex value $Y_n$) can be indicative of movement of an object within the communication channel. Conversely, a stable channel response may indicate lack of movement. Thus, in some implementations, the complex values $Y_n$ for each of multiple devices in a wireless network can be processed to detect whether motion has occurred in a space traversed by the transmitted signals f(t).

In another aspect of FIGS. 2A and 2B, beamforming may be performed between devices based on some knowledge of the communication channel (e.g., through feedback properties generated by a receiver), which can be used to generate one or more steering properties (e.g., a steering matrix) that are applied by a transmitter device to shape the transmitted beam/signal in a particular direction or directions. Thus, changes to the steering or feedback properties used in the beamforming process indicate changes, which may be caused by moving objects, in the space accessed by the wireless communication system. For example, motion may be detected by substantial changes in the communication channel, e.g. as indicated by a channel response, or steering or feedback properties, or any combination thereof, over a period of time.

In some implementations, for example, a steering matrix may be generated at a transmitter device (beamformer) based on a feedback matrix provided by a receiver device (beamformee) based on channel sounding. Because the steering and feedback matrices are related to propagation characteristics of the channel, these matrices change as objects move within the channel. Changes in the channel characteristics are accordingly reflected in these matrices, and by analyzing the matrices, motion can be detected, and different characteristics of the detected motion can be determined. In some implementations, a spatial map may be generated based on one or more beamforming matrices. The spatial map may indicate a general direction of an object in a space relative to a wireless communication device. In some cases, "modes" of a beamforming matrix (e.g., a feedback matrix or steering matrix) can be used to generate the spatial map. The spatial map may be used to detect the presence of motion in the space or to detect a location of the detected motion.

In some aspects of operation, a motion detection system may detect certain gestures (e.g., the first and second gestures 214A, 214B shown in FIGS. 2A, 2B or other types of gestures). For example, the motion detection system may distinguish certain types of gestures (e.g. arm waving or breathing) from other types of motion (e.g., walking or running) in the space. A gesture may be detected by analyzing channel information collected by the nodes (e.g., wireless communication devices 204A, 204B, 204C) communicating over a wireless communication network. The channel information may be collected by a channel sounding procedure (e.g., according to a Wi-Fi protocol) or another type of process. In some cases, a network may provide feedback to a node that initiated channel sounding, and the feedback may include a measure of the channel. The node that initiated the channel sounding may analyze the channel information at the node or provide the channel information to another node (e.g., a central hub) for making a determination about the movement and type of movement (e.g., identifying gesture or another type of motion). In some cases, the node measuring the channel may analyze the channel information and make the determination about the movement and type of movement. In some instances, gestures can include broad movements or minor movements. For example, a broad movement, such as a waving gesture, may be detected by a channel response having two distinct peaks in the analyzed channel response. As another example, a minor movement, such as respiratory activity or heart rate, may be detected by a channel response having smaller changes or smooth periodic oscillations.

In some cases, a gesture or series of gestures may be associated with an action to be taken by the device 220. For example, the network-connected device 220 may be controlled by the gestures 214A, 214B. As an example, the device 220 can be a Wi-Fi enabled alarm clock or another type of Wi-Fi device (e.g., a smartphone running an alarm clock application). In this example, the series of gestures 214A, 214B (e.g., such as waving an arm a certain number of times) can be associated with deactivating the alarm on the Wi-Fi device. In another example, the gestures of a particular breathing rate and/or heart rate may indicate that a person is awake or no longer sleeping, and those gestures may be associated with deactivating the alarm. Accordingly, a gesture or series of gestures may be associated with any action of the network-connected device 220, which may be controlled via the wireless communication network. Some examples include, turning on and off lights, activating and deactivating a home security system, etc. In some examples, a user application may be provided with, or on, the Wi-Fi connected device that provides an interface allowing the user to select gestures and associate the gestures to actions for controlling the device. In other cases, gestures may be selected and managed by the motion detection system, another device, etc.

Figure 3:
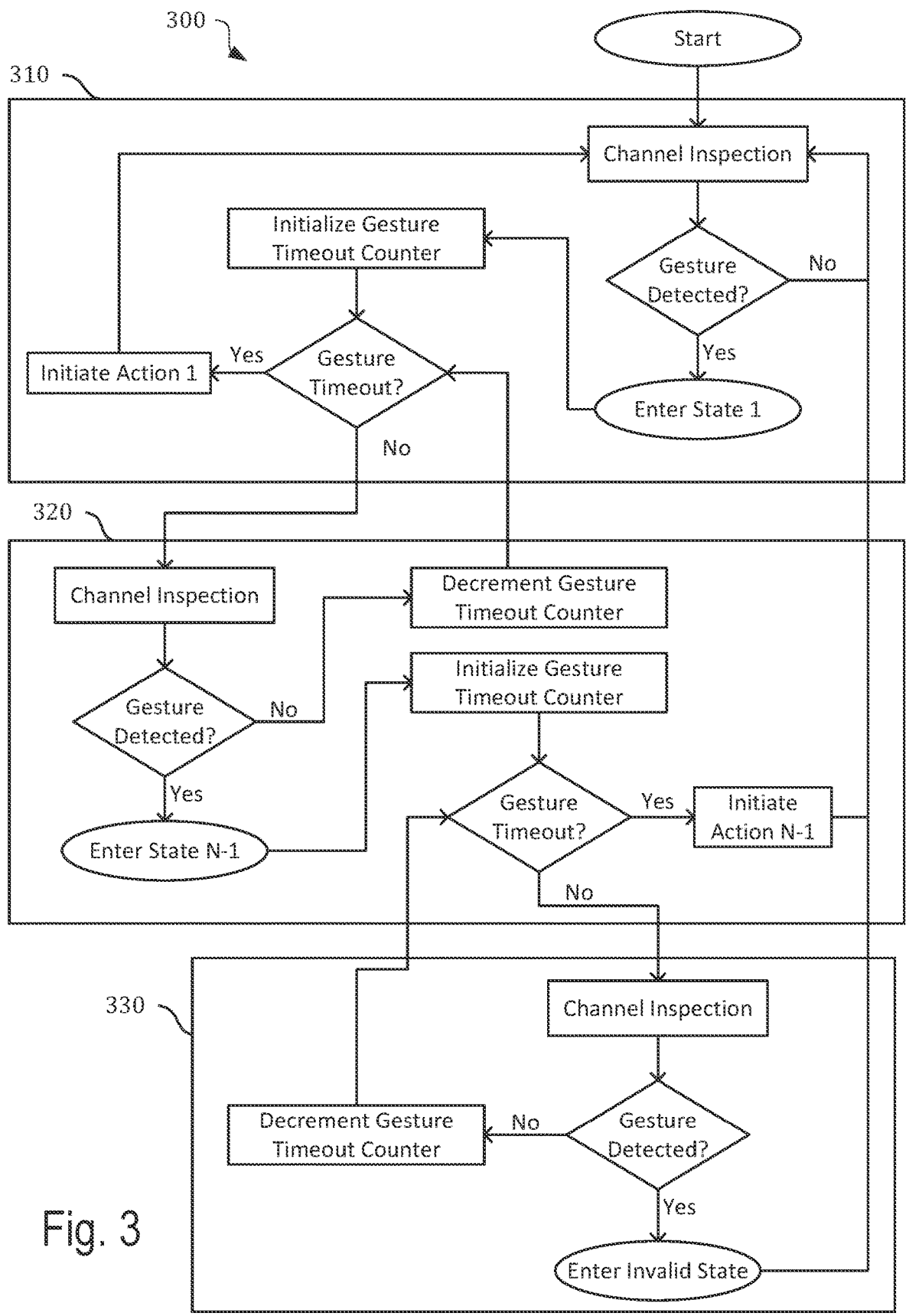
FIG. 3 is a flow diagram showing a process performed by an example state machine.

FIG. 3 is a flow diagram showing a process 300 performed by an example state machine, for example, in a motion detection system. The motion detection system can process information (e.g., channel information) based on wireless signals transmitted through a space to detect gestures (e.g., human gestures). Operations of the process 300 may be performed by a remote computer system (e.g., a server in the cloud), a wireless communication device (e.g., one or more of the wireless communication devices), or another type of system. For example, operations in the example process 300 may be performed by one or more of the example wireless communication devices 102A, 102B, 102C in FIG. 1.

The example process 300 may include additional or different operations, and the operations may be performed in the order shown or in another order. In some cases, one or more of the operations shown in FIG. 3 can be implemented as processes that include multiple operations, sub-processes or other types of routines. In some cases, operations can be combined, performed in another order, performed in parallel, iterated, or otherwise repeated or performed in another manner.

At a high level, FIG. 3 shows the example state machine entering three different states. At 310, the state machine enters "State 1"; at 320, the state machine enters "State N−1"; and at 330, the state machine enters an "Invalid State". The state machine may generally define any number of states; for example, the state machine may transit through a number of other states between "State 1" and "State N−1." The transition between states is controlled by a gesture recognition engine that detects gestures and by a gesture timeout counter that measures time between detected gestures. The gesture recognition engine detects gestures based on wireless signals transmitted by wireless communication devices (e.g., the wireless communication devices 102A, 102B, 102C shown in FIG. 1). The gesture timeout counter is used to determine whether two distinct gestures (e.g., the first gesture 214A at time t=0 in FIG. 2A and the second gesture 214B at time t=1 in FIG. 2B) occurred in the space within a gesture timeout period of each other. For example, the state machine may define a gesture timeout period of 1 second, 2 seconds, or another time duration.

In the example shown in FIG. 3, each valid state is associated with an action to be initiated if a gesture timeout is detected while the state machine is in that state. For example, "State 1" is associated with "Action 1", which is initiated if a gesture timeout is detected while the state machine is in "State 1"; similarly, "State N−1" is associated with "Action N−1", which is initiated if a gesture timeout is detected while the state machine is in "State N−1". The actions associated with the states of the state machine can be different types of action, actions to be performed by different types of devices, etc. The actions may include any of the example action types described above. For instance, the actions can include any type of command for a network-connected device (e.g., a command for either of the IoT devices 120A, 120B in FIG. 1). In some cases, one or more valid states are not associated with an action. For example, the state machine may be configured to initiate an action only after detecting multiple specific gestures.

At 310 channel inspection is performed (e.g., by a gesture recognition engine or another component of a motion detection system). The channel inspection process analyzes channel information to determine whether a gesture occurred. For example, the channel inspection process may include the example process 400 shown in FIG. 4 or another type of gesture recognition process. The channel inspection may produce output data (e.g., the gesture data 416 shown in FIG. 4) indicating whether a gesture was detected, a type of gesture detected, a location of a gesture detected, etc. If a gesture is not detected, the channel inspection continues at 310 based on new channel data.

If a gesture is detected at 310, the state machine is initialized to "State 1" and the gesture timeout counter is initialized. The gesture timeout counter can be initialized to a timeout value representing a maximum amount of time that the state machine will remain in "State 1" before a gesture timeout occurs. In an example, the state machine may process 10 channel responses per second, and the gesture timeout counter can be initialized to 10 for a gesture timeout period of 1 second, to 20 for a gesture timeout period of 2 seconds, etc.

After initializing the gesture timeout counter at 310, the process 300 proceeds to 320, and channel inspection is performed based on new channel data. If a gesture is not detected based on the channel inspection of the new channel data at 320, then the gesture timeout counter is decremented, and the process 300 returns to 310. If the gesture timeout counter reaches zero, then a gesture timeout is detected at 310 and "Action 1" is initiated.

Thus, in some instances, the state machine determines that a second gesture was not detected within the gesture timeout period of a first gesture detected by the channel inspection at 310, and the state machine initiates "Action 1" in response to detecting the gesture timeout at 310.

If a gesture is detected based on the channel inspection of the new channel data at 320, then the state machine is incremented to "State N−1" and the gesture timeout counter is reinitialized (e.g., to the same value that it was initialized to at 310 or another value).

After reinitializing the gesture timeout counter at 320, the process 300 proceeds to 330, and channel inspection is performed based on new channel data. If a gesture is not detected based on the channel inspection of the new channel data at 330, then the gesture timeout counter is decremented, and the process 300 returns to 310. If the gesture timeout counter reaches zero, then a gesture timeout is detected at 320 and "Action N−1" is initiated.

Thus, in some instances, the state machine determines that a sequence of gestures was detected by the channel inspections at 310 and 320, and that a gesture timeout occurred after reinitiating the gesture timeout counter at 320, and the state machine may then initiate "Action N−1" in response to detecting the gesture timeout at 320.

In the example shown in FIG. 3, "State N−1" is the final valid state for the state machine. Accordingly, if a gesture is detected based on the channel inspection of the new channel data at 330, then the state machine transits to the "Invalid" state, the process 300 returns to 310, and channel inspection is performed based on new channel data. Thus, in the example shown in FIG. 3, no action is initiated when the state machine reaches the "Invalid" state. The state machine may continue to operate as long as the motion detection system is active, for a predetermined amount of time or number of iterations, or until a terminating condition is reached.

Figure 4:
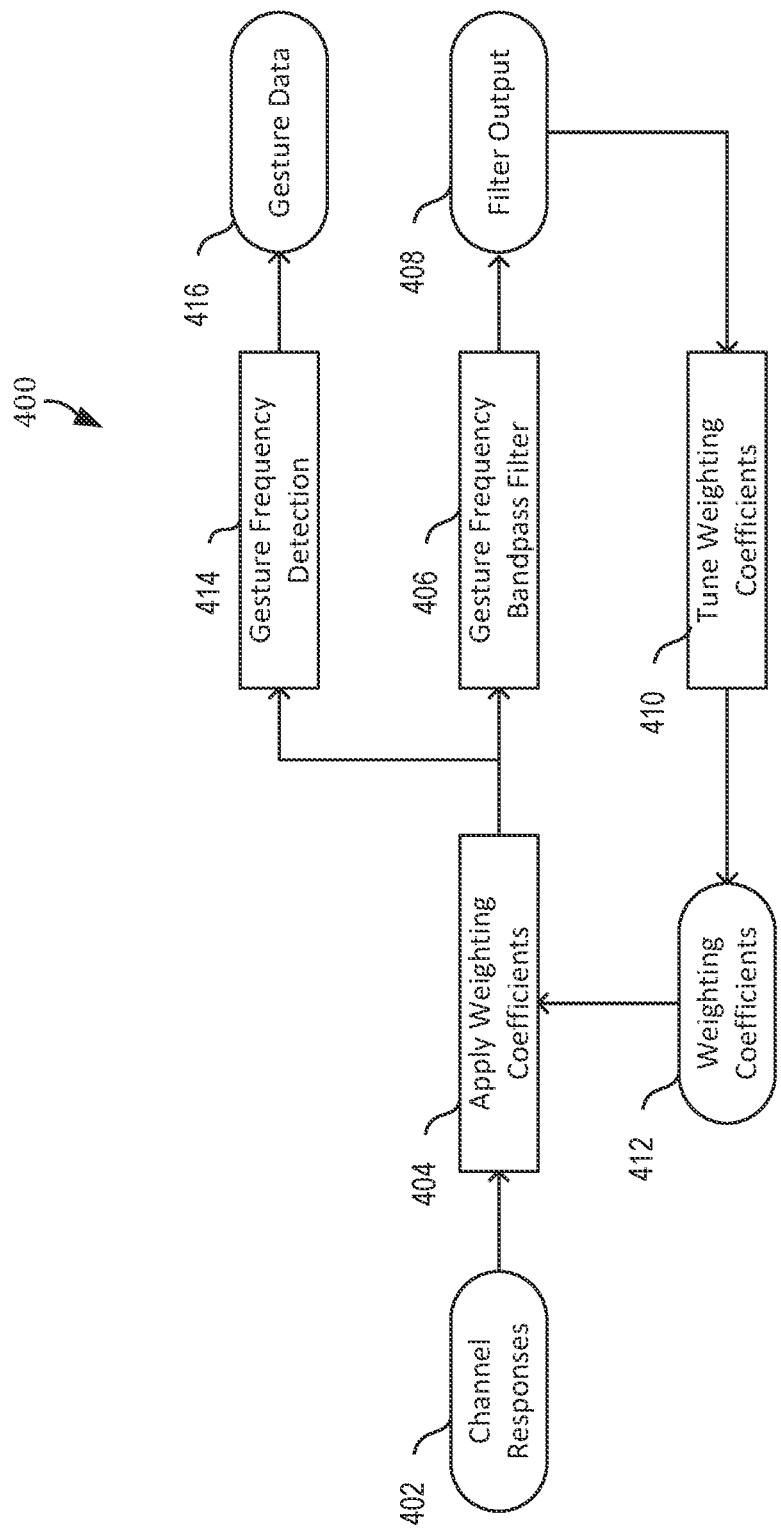
FIG. 4 is a flow diagram showing a process performed by an example gesture recognition engine.

FIG. 4 is a flow diagram showing a process performed by an example gesture recognition engine, for example, in a motion detection system. The motion detection system can process information based on wireless signals transmitted through a space to detect gestures (e.g., human gestures). Operations of the process 400 may be performed by a remote computer system (e.g., a server in the cloud), a wireless communication device (e.g., one or more of the wireless communication devices), or another type of system. For example, operations in the example process 400 may be performed by one or more of the example wireless communication devices 102A, 102B, 102C in FIG. 1.

The example process 400 may include additional or different operations, and the operations may be performed in the order shown or in another order. In some cases, one or more of the operations shown in FIG. 4 can be implemented as processes that include multiple operations, sub-processes or other types of routines. In some cases, operations can be combined, performed in another order, performed in parallel, iterated, or otherwise repeated or performed in another manner.

At a high level, the process 400 proceeds as follows. At 404, weighting coefficients 412 are applied to channel responses 402. At 406, a gesture frequency bandpass filter is applied to the weighted channel response data. The filter output 408 produced by the gesture frequency bandpass filter 406 is then used to tune the weighting coefficients 412. The modified weighting coefficients 412 are then reapplied to the channel responses at 404. The process may continue to adjust the weighting coefficients 412 until an optimization condition is reached. Generally, the weighting coefficients 412 can be positive or negative values. At 414, gesture frequency detection is applied to the weighted channel response data, e.g., based on the tuned weighting coefficients 412. The gesture frequency detection 414 can analyze the weighted channel response data to detect gestures that occurred in the space. When a gesture is detected, the gesture frequency detection process may generate gesture data 416 indicating that a gesture was detected. In some cases, the gesture data 416 indicates a type of gesture, a location of the gesture, or other information about the gesture.

A gesture in the space traversed by the wireless signals will modulate the intensity of wireless signals at the receiver. Accordingly, the process 400 analyzes a time-series of frequency-domain channel responses 402 (derived from the wireless signals) for a pattern in this intensity change. For instance, a quick wave of the hand two times may appear as a sinusoid with a frequency of approximately 0.5 Hertz. This pattern can be detected with a frequency-selective filter (the gesture frequency bandpass filter 406) acting on the time-series of the frequency-domain channel data. The intensity can be discriminative across the frequency bins of the channel response because a gesture may, in some instances, only be affecting one particular path of the signal (e.g., one ray). Modulating one particular path of a multipath signal can push some frequencies up and the others down, setting up a negative correlation coefficient of different frequency bins in time. Thus, different frequency components of the wireless signal are affected differently based on where in space the gesture is happening. Accordingly, the example process 400 may perform gesture recognition by examining all the frequencies of the channel responses 402 over time.

In the example shown in FIG. 4, applying the weighting coefficients 412 at 404 produces a combination of the frequencies for gesture recognition. The modulation of wireless signal intensity at the receiver can be a function of the speed/dynamics of the gesture. Accordingly, the gesture recognition engine may be configured to detect this intensity modulation, which can manifest as a time-frequency signature. The intensity modulation appears in the time domain of the channel responses 402 because of the physical dynamics of the gesture, and the intensity modulation also appears in the frequency domain of the channel responses 402 because of the physical location of the gesture affects only a portion of the multipath dynamics of the signal. This time-frequency signature can be detected, for example, with a time-frequency filter deployed as in FIG. 4 or otherwise. A time-frequency filter can include a specific pulse (e.g., Nyquist, Mexican-hat or otherwise) in time (which can be determined by the range of time-footprints that a gesture can generate) along with different gains across frequency (e.g., to weight the different frequency sub-carriers differently). Analogous to a conventional frequency-domain filter, a time-frequency may define a pass-band. Accordingly, a certain set of time-frequency signatures will pass through while others will be attenuated.

In some implementations, a time-frequency filter (or another type of gesture discriminating filter) is adaptively tuned by the motion detection system during its operation, so that it can pick up a gesture happening anywhere in the space. The ability to adaptively tune the time-frequency filter (e.g., by tuning the weighting coefficients 412 at 410) can be important, for example, due to variability of the time-frequency signature with different environments, and different locations where a gesture can be performed. To incorporate variations among different people and different environments, a bank of such filters can be designed with slightly different time-frequency footprints. Hence, a linear combination of channel response frequency components (corresponding to different frequency bins) can be formed and fed to a line spectrum estimation block (e.g., at 406) which looks for the characteristic frequencies associated with human gestures. Once the process 400 detects that signature, other members of the sequence (that forms a complete gesture) can be detected. When no further gestures are detected, the gesture sequence can be interpreted.

Accordingly, the process 400 in FIG. 4 shows an example of how an adaptive gesture filter can be applied to channel responses. In some cases, a frequency band for gestures is determined (e.g., 0 to 4 Hertz; 0.25 to 0.75 Hertz; or another frequency band). Then a linear combination of difference subcarriers is generated at 404, such that each subcarrier is multiplied with a complex exponential to phase advance or retard it in the time series. The weights on each sub-carrier are adaptively tuned at 410. In some examples, the objective of the tuning process at 410 is to combine the sub-carriers most coherently for detecting the gesture time pattern with the best possible signal to noise ratio (SNR). If the gesture acts to create two frequency bins vibrating out of phase, for example, the coherent combination may bring them into alignment. In some cases, an adaptive filter tuning the weights can be designed with the criterion to maximize the energy in the pass-band associated with human gestures. Once the filter weights have been tuned, the data can again be passed through the tuned filter, and then fed to a frequency discriminator at 414 to recognize time-frequency signatures of respective gestures.

Figure 5:
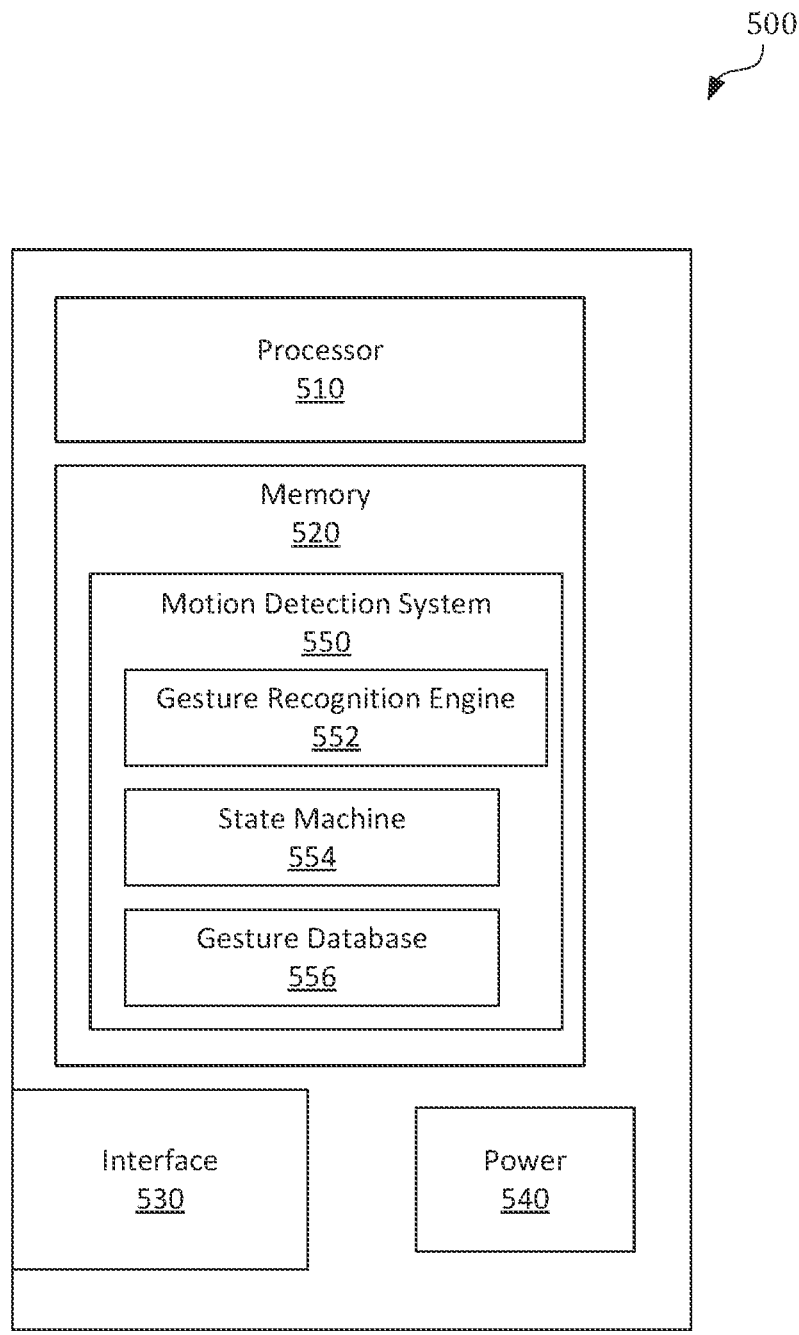
FIG. 5 is a block diagram showing an example wireless communication device.

FIG. 5 is a block diagram showing an example wireless communication device 500. As shown in FIG. 5, the example wireless communication device 500 includes an interface 530, a processor 510, a memory 520, and a power unit 540. A wireless communication device (e.g., any of the wireless communication devices 102A, 102B, 102C in FIG. 1) may include additional or different components, and the wireless communication device 500 may be configured to operate as described with respect to the examples above. In some implementations, the interface 530, processor 510, memory 520, and power unit 540 of a wireless communication device are housed together in a common housing or other assembly. In some implementations, one or more of the components of a wireless communication device can be housed separately, for example, in a separate housing or other assembly.

The example interface 530 can communicate (receive, transmit, or both) wireless signals. For example, the interface 530 may be configured to communicate radio frequency (RF) signals formatted according to a wireless communication standard (e.g., Wi-Fi, 4G, 5G, Bluetooth, etc.). In some implementations, the example interface 530 includes a radio subsystem and a baseband subsystem. The radio subsystem may include, for example, one or more antennas and radio frequency circuitry. The radio subsystem can be configured to communicate radio frequency wireless signals on the wireless communication channels. As an example, the radio subsystem may include a radio chip, an RF front end, and one or more antennas. The baseband subsystem may include, for example, digital electronics configured to process digital baseband data. In some cases, the baseband subsystem may include a digital signal processor (DSP) device or another type of processor device. In some cases, the baseband system includes digital processing logic to operate the radio subsystem, to communicate wireless network traffic through the radio subsystem or to perform other types of processes.

The example processor 510 can execute instructions, for example, to generate output data based on data inputs. The instructions can include programs, codes, scripts, modules, or other types of data stored in memory 520. Additionally or alternatively, the instructions can be encoded as pre-programmed or re-programmable logic circuits, logic gates, or other types of hardware or firmware components or modules. The processor 510 may be or include a general-purpose microprocessor, as a specialized co-processor or another type of data processing apparatus. In some cases, the processor 510 performs high level operation of the wireless communication device 500. For example, the processor 510 may be configured to execute or interpret software, scripts, programs, functions, executables, or other instructions stored in the memory 520. In some implementations, the processor 510 may be included in the interface 530 or another component of the wireless communication device 500.

The example memory 520 may include computer-readable storage media, for example, a volatile memory device, a non-volatile memory device, or both. The memory 520 may include one or more read-only memory devices, random-access memory devices, buffer memory devices, or a combination of these and other types of memory devices. In some instances, one or more components of the memory can be integrated or otherwise associated with another component of the wireless communication device 500. The memory 520 may store instructions that are executable by the processor 510. For example, the instructions may include instructions to perform one or more of the operations in the example processes 300, 400 shown in FIGS. 3 and 4.

In the example shown in FIG. 5, the memory 520 stores instructions that, when executed by the processor 510, perform operations of a motion detection system 550. The example motion detection system 550 includes a gesture recognition engine 552, a state machine 554, a gesture database 556 and other components. In some cases, the motion detection system 550 is configured to perform one or more operations described above with respect to FIGS. 1, 2A, 2B, 3 and 4. In addition, the motion detection system 550 includes a distinct motion detection engine to detect motion of objects in a space, and the gesture recognition engine 552 uses a distinct process to detect gestures in the space.

The example gesture recognition engine 552 includes instructions that, when executed by the processor 510, can detect gestures (e.g., human gestures) based on channel information obtained from wireless signals. For example, the gesture recognition engine 552 may perform one or more operations of the example process 400 shown in FIG. 4. In some instances, the gesture recognition engine 552 detects a sequence of gestures and provides gesture data to the state machine 554.

The example state machine 554 includes instructions that, when executed by the processor 510, can initiate an action associated with a detected gesture or sequence of gestures. For example, the state machine 554 may perform one or more operations of the example process 300 shown in FIG. 3. In some instances, the state machine 554 accesses the gesture database 556 to identify an action associated with a state of the state machine 554 or a detected gesture or gesture sequence.

The example gesture database 556 includes data that associates gestures (e.g., individual gestures, gesture sequences, etc.) with respective actions to be initiated by the motion detection system 550 in response to the gestures. In some cases, the gesture database 556 includes data entries that directly associate specific gestures or gesture sequences with respective actions to be initiated. In some cases, the gesture database 556 includes data entries that directly associate specific states of the state machine 554 with the respective actions to be initiated by the motion detection system 550. The gesture database 556 may be configured in another manner.

The example power unit 540 provides power to the other components of the wireless communication device 500. For example, the other components may operate based on electrical power provided by the power unit 540 through a voltage bus or other connection. In some implementations, the power unit 540 includes a battery or a battery system, for example, a rechargeable battery. In some implementations, the power unit 540 includes an adapter (e.g., an AC adapter) that receives an external power signal (from an external source) and coverts the external power signal to an internal power signal conditioned for a component of the wireless communication device 500. The power unit 540 may include other components or operate in another manner.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

Some of the operations described in this specification can be implemented as operations performed by a data processing apparatus on data stored on one or more computer-readable storage devices or received from other sources.

The term "data-processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

In a general aspect, a motion detection system detects gestures (e.g., human gestures) and initiates actions in response to the detected gestures.

In a first example, channel information is obtained based on wireless signals transmitted through a space by one or more wireless communication devices. A gesture recognition engine analyzes the channel information to detect a gesture (e.g., a predetermined gesture or a predetermined gesture sequence) in the space. An action to be initiated in response to the detected gesture is identified. An instruction to perform the action is sent to a network-connected device associated with the space.

Implementations of the first example may include one or more of the following features. A location of the gesture may be detected, and the action to be initiated (e.g., a type of action, a location of the action, or a device to perform the action) can be determined based on the location of the gesture. Detecting the gesture may include detecting a sequence of gestures. Detecting the sequence of gestures may include determining that a first gesture and a second gesture occurred in the space within a gesture timeout period. Detecting the sequence of gestures may include: in response to detecting the first gesture, initiating a state of a state machine and initiating a gesture timeout counter; in response to detecting the second gesture within the gesture timeout period, progressing the state of the state machine and initiating the gesture timeout counter; after reinitiating the gesture timeout counter, detecting a gesture timeout based on the gesture timeout counter; and identifying the action based on the state of the state machine at the gesture timeout.

Implementations of the first example may include one or more of the following features. Detecting the gesture may include using a time-frequency filter to detect a time-frequency signature of the gesture. The channel information may include a time series of channel responses, and using the time-frequency filter may include applying weighting coefficients to frequency components of the channel responses. The time-frequency filter may include an adaptive time-frequency filter that tunes the weighting coefficients to detect time-frequency signatures of gestures. The adaptive time-frequency filter may tune the weighting coefficients to detect gestures that modulate an intensity of the channel responses at in a frequency range corresponding to human gestures (e.g., 0 to 4 Hertz, 0.25 to 0.75 Hertz, or another frequency range).

In a second example, a non-transitory computer-readable medium stores instructions that are operable when executed by data processing apparatus to perform one or more operations of the first example. In a third example, a system includes wireless communication devices, a wireless-connected device and a computer device configured to perform one or more operations of the first example.

Implementations of the third example may include one or more of the following features. One of the wireless communication devices can be or include the computer device. One of the wireless communication devices can be or include the network-connected device. The computer device can be located remote from the wireless communication devices and/or the network-connected device.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A method comprising:
obtaining channel information based on wireless signals transmitted through a space by one or more wireless communication devices;
by operation of a gesture recognition engine, analyzing the channel information to detect a gesture in the space, wherein detecting the gesture comprises using a time-frequency filter to detect a time-frequency signature of the gesture;
identifying an action to be initiated in response to the detected gesture; and
sending, to a network-connected device associated with the space, an instruction to perform the action.

2. The method of claim 1, comprising:
detecting a location of the gesture; and
determining the action to be initiated based on the location of the gesture.

3. The method of claim 1, wherein detecting the gesture comprises detecting a sequence of gestures, and detecting the sequence of gestures comprises determining that a first gesture and a second gesture occurred within a gesture timeout period.

4. The method of claim 3, wherein detecting the sequence of gestures comprises:
in response to detecting the first gesture, initiating a state of a state machine and initiating a gesture timeout counter;
in response to detecting the second gesture within the gesture timeout period, progressing the state of the state machine and reinitiating the gesture timeout counter;
after reinitiating the gesture timeout counter, detecting a gesture timeout based on the gesture timeout counter; and
identifying the action based on the state of the state machine at the gesture timeout.

5. The method of claim 1, wherein the channel information comprises a time series of channel responses, and using the time-frequency filter comprises applying weighting coefficients to frequency components of the channel responses.

6. The method of claim 5, wherein the time-frequency filter comprises an adaptive time-frequency filter that tunes the weighting coefficients to detect time-frequency signatures of gestures.

7. The method of claim 6, wherein the adaptive time-frequency filter tunes the weighting coefficients to detect gestures that modulate an intensity of the channel responses at a frequency in a frequency range corresponding to human gestures.

8. A non-transitory computer-readable medium comprising instructions that are operable, when executed by data processing apparatus, to perform operations comprising:
obtaining channel information based on wireless signals transmitted through a space by one or more wireless communication devices;
by operation of a gesture recognition engine, analyzing the channel information to detect a gesture in the space, wherein detecting the gesture comprises using a time-frequency filter to detect a time-frequency signature of the gesture;
identifying an action to be initiated in response to the detected gesture; and
sending, to a network-connected device associated with the space, an instruction to perform the action.

9. The computer-readable medium of claim 8, the operations comprising:
detecting a location of the gesture; and
determining the action to be initiated based on the location of the gesture.

10. The computer-readable medium of claim 8, wherein detecting the gesture comprises detecting a sequence of gestures, and detecting the sequence of gestures comprises determining that a first gesture and a second gesture occurred within a gesture timeout period.

11. The computer-readable medium of claim 10, wherein detecting the sequence of gestures comprises:
in response to detecting the first gesture, initiating a state of a state machine and initiating a gesture timeout counter;
in response to detecting the second gesture within the gesture timeout period, progressing the state of the state machine and reinitiating the gesture timeout counter;
after reinitiating the gesture timeout counter, detecting a gesture timeout based on the gesture timeout counter; and
identifying the action based on the state of the state machine at the gesture timeout.

12. The computer-readable medium of claim 8, wherein the channel information comprises a time series of channel responses, and using the time-frequency filter comprises applying weighting coefficients to frequency components of the channel responses.

13. The computer-readable medium of claim 12, wherein the time-frequency filter comprises an adaptive time-frequency filter that tunes the weighting coefficients to detect time-frequency signatures of gestures.

14. The computer-readable medium of claim 13, wherein the adaptive time-frequency filter tunes the weighting coefficients to detect gestures that modulate an intensity of the channel responses at a frequency in a frequency range corresponding to human gestures.

15. A system comprising:
wireless communication devices operable to transmit wireless signals through a space;
a network-connected device associated with the space; and
a computer device comprising one or more processors operable to perform operations comprising:
obtaining channel information based on wireless signals transmitted through the space by one or more of the wireless communication devices;
by operation of a gesture recognition engine, analyzing the channel information to detect a gesture in the space, wherein detecting the gesture comprises using a time-frequency filter to detect a time-frequency signature of the gesture;
identifying an action to be initiated in response to the detected gesture; and
sending, to a network-connected device associated with the space, an instruction to perform the action.

16. The system of claim 15, the operations comprising:
detecting a location of the gesture; and determining the action to be initiated based on the location of the gesture.

17. The system of claim 15, wherein detecting the gesture comprises detecting a sequence of gestures, and detecting the sequence of gestures comprises determining that a first gesture and a second gesture occurred within a gesture timeout period.

18. The system of claim 17, wherein detecting the sequence of gestures comprises:
- in response to detecting the first gesture, initiating a state of a state machine and initiating a gesture timeout counter;
- in response to detecting the second gesture within the gesture timeout period, progressing the state of the state machine and reinitiating the gesture timeout counter;
- after reinitiating the gesture timeout counter, detecting a gesture timeout based on the gesture timeout counter; and
- identifying the action based on the state of the state machine at the gesture timeout.

19. The system of claim 15, wherein the channel information comprises a time series of channel responses, and using the time-frequency filter comprises applying weighting coefficients to frequency components of the channel responses.

20. The system of claim 19, wherein the time-frequency filter comprises an adaptive time-frequency filter that tunes the weighting coefficients to detect time-frequency signatures of gestures.

21. The system of claim 20, wherein the adaptive time-frequency filter tunes the weighting coefficients to detect gestures that modulate an intensity of the channel responses at a frequency in a frequency range corresponding to human gestures.

* * * * *